Sept. 19, 1939.   V. W. KLIESRATH   2,173,116
CLUTCH CONTROL
Filed April 21, 1934
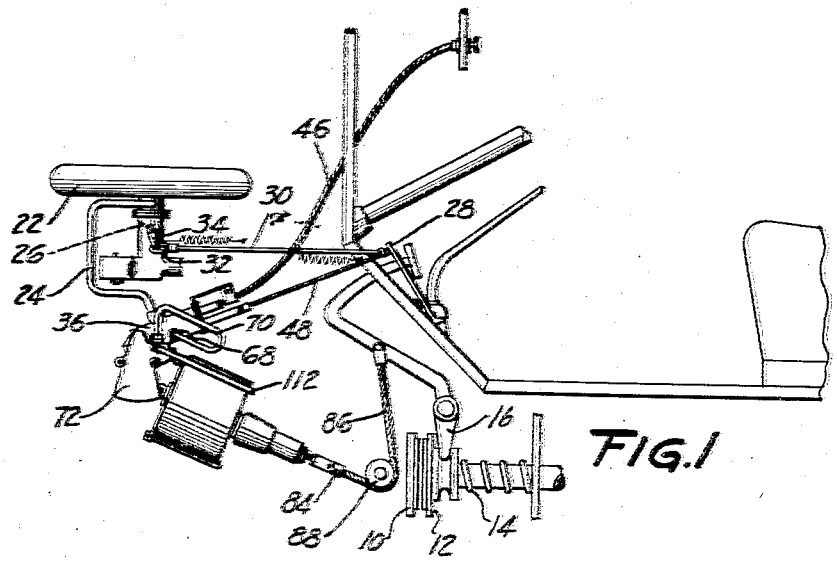
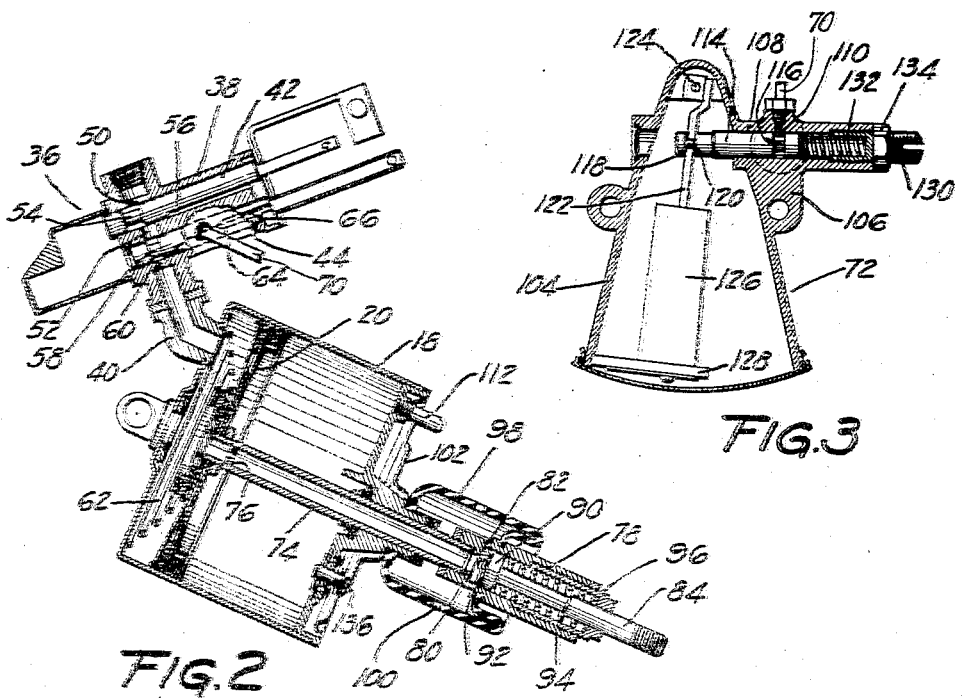
INVENTOR.
VICTOR W. KLIESRATH
BY
ATTORNEY Patented Sept. 19, 1939

2,173,116

UNITED STATES PATENT OFFICE 2,173,116

CLUTCH CONTROL

Victor W. Kliesrath, South Bend, Ind., assignor to Bendix Aviation Corporation, South Bend, Ind., a corporation of Delaware Application April 21, 1934, Serial No. 721,683

6 Claims. (Cl. 192—.01)

This invention relates to automatic clutch control mechanism for an automotive vehicle.

The invention is particularly directed to certain details of construction of a vacuum operated mechanism of this type, said construction insuring a cheaply fabricated but nevertheless efficient unit well capable of so controlling the operation of the clutch as to simulate a conventional manual operation thereof.

Acknowledgment is made of certain issued patents and pending applications disclosing the basic features of the instant invention, notably Patent No. 1,470,272, dated October 9, 1923, granted to Ross I. Belcia, Patent No. 1,858,999, dated May 17, 1932, granted to H. J. McCollum et al., application No. 622,998 of O. K. Kelley, dated July 16, 1932, and application No. 622,513 of Harold W. Price et al., dated July 14, 1932.

The above disclosures, in brief, include a manifold vacuum operated motor operably connected to a clutch and controlled by valvular means comprising a manually operated combined three-way, cut-out and bleed valve unit, and a bleed valve incorporated as a force transmitting element in series in the connection between the power element of the motor and the clutch and operable when the clutch plates first contact to vary the rate of clutch engagement.

The instant invention, as above indicated, is directed to improvements upon the above mechanism, and in particular includes a simple but effective type of inertia operated valve for insuring a smooth clutch engagement, a compact mounting for said valve upon the clutch operating motor, a clutch motor construction including a valve mechanism of relatively few working parts and operable to terminate a relatively rapid first stage of clutch engaging operation of the motor when and if the driving and driven friction elements of the clutch are loaded to a predetermined degree.

A further object of the invention is to provide a compact and portable clutch control unit readily adapted for installation either as original equipment or as an accessory in a used car.

A further object of the invention is to provide a clutch controlling mechanism wherein the clutch engaging operation of the mechanism may be arrested or completely stopped immediately prior to a driving engagement of the clutch plates, the completion of the engagement of the clutch being effected by a distinct operation of a bleed valve controlling the aforementioned mechanism.

The invention also includes other desirable details of construction and combination of parts, which will be apparent to those skilled in the art after a consideration of the following specification taken in conjunction with the accompanying drawing, in which:

Figure 1 is a diagrammatic view, in side elevation, of the clutch control mechanism constituting the invention;

Figure 2 is a sectional view of the combined motor and valve unit and disclosing certain features of the invention in detail; and Figure 3 is a sectional view of the inertia operated valve mechanism of the invention.

There is disclosed diagrammatically in Figure 1 a conventional friction clutch comprising driving and driven elements 10 and 12 urged into driving engagement by a conventional clutch spring 14, the driven element 12 of the clutch being operably connected to a clutch pedal 16, which may be either manually or power operated, as disclosed.

The present invention is directed to the automatically operable power means for controlling the operation of the clutch and comprises a pressure differential operated clutch motor including fixed and movable cylinder and piston elements 18 and 20 respectively, the latter being operably connected to the clutch pedal 16 by force transmitting means described in greater detail hereinafter. The clutch motor is adapted to be energized to disengage the clutch by means of its connection with a manifold 22 of the internal-combustion engine, the manifold serving as a source of vacuum at closed throttle, as is well known in this art. The fluid transmitting connections interconnecting the manifold and cylinder comprise a conduit 24, preferably connected to the manifold or induction passage of the engine just above a throttle valve 26, the latter being operably connected to an accelerator 28 by a link 30 having a lost motion connection 32 with a throttle operating crank 34.

A combined three-way, bleed and cut-out valvular unit 36 is incorporated in the fluid transmitting connection between the cylinder 18 and conduit 24, the said valvular unit comprising a casing 38 fixedly mounted to a boss 40 secured to the clutch motor cylinder, all as disclosed in Figures 1 and 2. The valve casing comprises parallel bores adapted to receive reciprocable plunger members 42 and 44 connected respectively to a Bowden control 46, operable from the dash, and the accelerator 28. The accelerator and plunger 44 are interconnected by means of a link 48. The plunger 42 constitutes a cut-out valve and in its inoperative position interconnects cross-bore ports 50 and 52 of the valve casing through the intermediary of a waist portion 54. The plunger 42 is further provided with a slot 56 communicating with the atmosphere, and upon moving the plunger to the left, Figure 2, the clutch motor is permanently vented to the atmosphere to render the motor inoperative. It is then, of course, necessary to operate the clutch in the conventional manner by the clutch pedal 16.

The valve plunger 44, which constitutes a combined three-way and bleed valve member, is provided with a recessed or waist portion 58 adapted to interconnect port 52 and a port 60 with the accelerator in its released position, thus interconnecting the manifold with the clutch motor to evacuate the motor and disengage the clutch, the motor piston 20 moving to the position disclosed in Figure 2 against the compression of a return spring 62. Upon depressing the accelerator the plunger 44 is moved to the left, Figure 2, to cut off the connection with the manifold via port 52 and interconnect an atmospheric slot 64 in the plunger with the port 60 to thus vent the clutch motor to the atmosphere and initiate the engagement of the clutch.

The waist portion 58 and the slot 64 thus provide in effect a three-way valve for initiating the clutch disengaging and engaging operations of the clutch motor. The accelerator operated plunger 44 is further provided with a tapered slot 66 of progressively varying depth, said slot adapted to register with a port 68, Figure 1, in the valve casing interconnected by a conduit 70 with an inertia operated control valve 72, both the slot 66 and the valve 72 to be described in detail hereinafter.

The connection between the piston 20 of the clutch motor and the clutch pedal constitutes an important feature of the instant invention and comprises two major relatively movable parts. One of said parts comprises a tube 74, open at one end and provided with ports 76 at its other end communicating the interior of the cylinder 18 with the bore of the tube. Upon the end of the tube there is threadably mounted a hollow extension member 78 provided with an annular flange 80 constituting a valve seat and an annular series of vent ports 82 adjacent one end thereof. The other of the two aforementioned parts comprises a rod 84 adjustably connected to a flexible tension element 86 connected at one end to the clutch pedal, the flexible element passing about a direction-changing sheave 88. To one end of the rod 84 there is secured a piston element 90 having a sliding fit within the extension member 78, and to the outer face of said element there is fixedly secured a valve member 92 adapted to seat upon the flange 80, the latter contacting the end face of the tubular member 74. A compression spring 94, weaker than the clutch spring 14, completes the connection between the piston 20 and clutch pedal, said spring being compressed between the piston element 90 and the inner face of a sleeve-like nut 96 threadedly mounted in the end of the extension 78. A protecting boot 98, provided with vent openings 100, is secured at one of its ends to a cover plate 102 mounted on one end of the cylinder 18 and at its other end to a groove 103 within the extension 78.

A further feature of the invention is disclosed in detail in Figure 3, the same comprising an inertia operated bleed controlling valve means. This device comprises a hollow triangularly-shaped casing member 104 fixedly mounted, as disclosed in Figure 1, to the boss 40. The casing is provided with an integral boss 106 having a lengthwise extending bore 108 and a rectangular-shaped cross-bore 110, the latter serving to interconnect conduit 70 and a conduit 112 connected respectively to the valve unit and the clutch motor. The bore 108 of the valve casing receives a reciprocable valve plunger 114 having a waist portion 116, one end of the plunger being provided with a second waist portion 118 receiving trunnion pins 120 secured to a U-shaped link 122, the latter being connected at one of its ends to a pivot mounting 124 secured to the valve casing and at its other end to a weight or bob member 126. The weight member is preferably provided at one of its ends with a fixedly-mounted felt stop 128 adapted to contact the casing 104. The boss 106 of the valve casing is provided with an adjustable nut 130 adapted to vary the tension of a valve operating return spring 132 interposed between the inner face of the nut and the end of the valve plunger member 114. A lock nut 134 serves to secure the nut 130 in its adjusted position.

Describing now the operation of the aforementioned mechanism, with release of the accelerator pedal the three-way and bleed valve plunger 44 is operated to interconnect the manifold with the clutch motor, thus evacuating or energizing the same and disengaging the clutch, a check valve 136 in the end of the cylinder 18 insuring this operation. The piston 20 in its clutch disengaging movement acts first to compress spring 94, which is weaker than the clutch spring, thus opening the bleed valve constituted by the flange 80 and member 92. Further movement of the piston serves to disengage the clutch, the piston moving to the position disclosed in Figure 2. When it is desired to engage the clutch, i. e. often a free-wheeling operation, a gear shifting operation or in starting the vehicle from rest, the accelerator is depressed, thus operating the three-way valve to vent the clutch motor and initiate the clutch engaging operation under the action of the clutch springs. The piston 20 then moves relatively rapidly by virtue of the rapid efflux of air from the motor via the bleed valve 80, 92, thus proving what may be termed a rapid first stage of clutch engagement. In effecting this operation the accelerator may be moved just sufficiently to take up the lost motion at 32, and accordingly the plunger 44 is not moved sufficiently to register the bleed slot 66 with the port 68. When the piston 20 has moved sufficiently to bring the clutch elements 10 and 12 into engagement, the load of the clutch springs is reduced, thereby permitting the spring 94 to expand, closing the valve 80, 92 and trapping the air in the clutch motor. The relative strengths of the spring 94 and clutch springs are so adjusted that the valve 80, 92 is closed immediately after the clutch plates contact. The rapid engaging movement of the clutch is thus terminated when the clutch plates contact the structure, thus providing a mechanism automatically compensating for clutch plate wear.

As indicated above, the bleed valve comprising the port 68 and the slotted portion 66 of the plunger 44 is not rendered operative during the aforementioned operation; therefore, unless the accelerator is further depressed, the engagement of the clutch is not completed, the movement of the driven clutch plate being arrested or completely stopped. Thus in traffic driving the clutch may be prepared for a quick engagement by partially depressing the accelerator: preferably the parts are so adjusted that the throttle is not opened during this preliminary movement of the accelerator. This arresting or stopping operation of the clutch may be obviated, however, by an uninterrupted depression of the accelerator, and practically all engagements of the clutch are effected in this manner.

In order to complete the engagement of the clutch the accelerator is now further depressed, thus opening the aforementioned bleed valve 66, 68, the rate of engagement being determined by the rate of accelerator movement, the clutch springs acting to continue to force the air from the clutch motor.

The valve of Figure 3 functions to insure a smooth starting operation of the vehicle by automatically cutting off the aforementioned bleed via valve 66, 68 when the acceleration is excessive, the latter being caused by unduly loading the clutch plates. Thus should the loading be excessive by virtue of a careless sudden depression of the accelerator, the inertia effect of the bob 126 acting against the spring 132 results in a movement of the plunger 114 to cut off the connection between the conduits 112 and 70. The air is thus trapped in the compression end of the clutch motor, maintaining the then existing loading of the slipping clutch plates until the acceleration factor is reduced to again move the plunger 114, permitting a resumption of the bleed of air from the clutch motor and a continued engagement of the clutch. The spring 132 is adjusted to effect the desired critical acceleration. The parts of the inertia valve unit are completely enclosed, thus preventing the entrance of dirt and other foreign matter to the working parts: furthermore, the casing 104 acts as a shield to obviate the effect of the blast of air from the motor cooling fan, which would tend to operate the valve.

While one illustrative embodiment has been described, it is not my intention to limit the scope of the invention to that particular embodiment, or otherwise than by the terms of the appended claims.

I claim:

1. In an automotive vehicle provided with a clutch, power means for operating said clutch, said power means comprising a pressure differential operated motor including relatively movable, fixed and power elements, and means interconnecting said power element and clutch comprising an open-ended hollow rod connected at one of its ends to the power element, a tubular extension adjustably mounted on the other end of said rod, a link member connected at one of its ends to the clutch and sleeved at its other end within said extension, and yieldable means housed within said extension and serving to interconnect said rod and link one with another.

2. In an automotive vehicle provided with a clutch, power means for operating said clutch, said power means comprising a pressure differential operated motor including relatively movable, fixed and power elements, and means interconnecting said power element and clutch comprising an open-ended hollow rod connected at one of its ends to the power element, a tubular extension adjustably mounted on the other end of said rod, a link member connected at one of its ends to the clutch and sleeved at its other end within said extension, and a valve member secured to one end of said link and adapted to seal up one end of said open-ended rod as the clutch is being engaged.

3. In a clutch operating power device comprising a reciprocable power element, means for interconnecting said power element with a clutch to be operated comprising a tubular rod, the open end of which constitutes one part of the valve mechanism, and a link member having a valve member secured to one end thereof and adapted to seat upon the aforementioned valve part when the clutch is engaged and during a portion of the period of its engagement.

4. In an automotive vehicle provided with a clutch including friction elements and a clutch spring, power means for controlling the operation of the clutch comprising a motor having relatively movable, fixed and power elements and valvular means for controlling the clutch disengaging and engaging operations of said motor, and further comprising force transmitting means interconnecting said power element and clutch, said latter means comprising a clutch spring operated poppet valve, said valve constituting a part of the aforementioned valvular means and operable to control the clutch engaging operation of the said motor.

5. An inertia operated valve for controlling the clutch engaging operation of a clutch operating pressure differential motor comprising a fixed casing member provided with cross bores, a valve plunger member reciprocable within one of said bores, and a plunger operating weight member pivoted to and housed within said casing, said weight member having a stop member secured to one end thereof and contactable with said casing to limit the throw of said plunger member.

6. In an automotive vehicle provided with a clutch, a power unit for operating the clutch comprising a pressure differential operated motor and valve means for controlling the operation of said motor comprising a combined three-way and bleed valve unit fixed to said motor, a bleed controlling inertia valve unit also mounted on said motor adjacent said aforementioned valve unit, and fluid transmitting connections interconnecting said valve units and motor whereby there is provided a unitary, compact and portable power unit readily adapted for installation in an automotive vehicle.

VICTOR W. KLIESRATH.